United States Patent
Bonner et al.

(10) Patent No.: US 7,619,540 B2
(45) Date of Patent: Nov. 17, 2009

(54) APPARATUS AND METHODS FOR DETERMINING ISOTROPIC AND ANISOTROPIC FORMATION RESISTIVITY IN THE PRESENCE OF INVASION

(75) Inventors: Stephen D. Bonner, Sugar Land, TX (US); Dean M. Horman, Sugar Land, TX (US); Gerald M. Minerbo, Missouri City, TX (US); Richard A. Rosthal, Houston, TX (US); Kuo-Chiang Chen, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 49 days.

(21) Appl. No.: 11/436,015

(22) Filed: May 17, 2006

(65) Prior Publication Data

US 2006/0202806 A1 Sep. 14, 2006

Related U.S. Application Data

(62) Division of application No. 10/707,813, filed on Jan. 14, 2004, now Pat. No. 7,091,877.

(60) Provisional application No. 60/514,720, filed on Oct. 27, 2003.

(51) Int. Cl.
*G01V 3/00* (2006.01)
(52) U.S. Cl. .......................... 340/853.1; 702/7; 702/11; 324/338; 324/339
(58) Field of Classification Search ............... 340/853.1; 702/11, 7; 324/338, 339
See application file for complete search history.

(56) References Cited

U.S. PATENT DOCUMENTS 3,067,383 A 12/1962 Tanguy (Continued)

FOREIGN PATENT DOCUMENTS

RU 2069878 11/1996

(Continued)

OTHER PUBLICATIONS

VF Machetin, et al., "TEMP-a New Dual-Electromagnetic and Laterolog Apparatus-Technological Complex," 13th European Formation Evaluation Symposium Transactions, Budapest Chapter, SPWLA, Paper K (1990).

(Continued)

*Primary Examiner*—Albert K Wong
(74) *Attorney, Agent, or Firm*—Darla P. Fonseca; Jaimae Castano; Dale Gaudier (57) ABSTRACT

A logging tool includes a tool body; a simple transmitter comprising a single antenna disposed on the tool body; four simple receivers, each comprising a single antenna, disposed on the tool body and spaced apart from the simple transmitter to form four arrays; and an electronic module for controlling operation of the four arrays, wherein the simple transmitter is configured to generate a magnetic field having a transverse component, wherein each of the four simple receivers is sensitive to the magnetic field generated by the simple transmitter, and at least one of the four simple receivers is sensitive to the transverse component of the magnetic field generated by the simple transmitter, and wherein the four arrays are configured to provide measurements at least three depths of investigation.

29 Claims, 8 Drawing Sheets

U.S. PATENT DOCUMENTS

| | | | |
|---|---|---|---|
| 3,187,252 A | 6/1965 | Hungerford |
| 3,329,889 A | 7/1967 | Tanguy |
| 3,510,757 A | 5/1970 | Huston |
| 3,609,521 A | 9/1971 | Desbrandes |
| 4,302,722 A | 11/1981 | Gianzero |
| 4,360,777 A | 11/1982 | Segesman |
| 4,636,731 A | 1/1987 | Savage et al. |
| 4,849,699 A | 7/1989 | Gill et al. |
| 5,157,605 A | 10/1992 | Chandler et al. |
| 5,359,324 A | 10/1994 | Clark et al. |
| 5,550,473 A | 8/1996 | Klein |
| 5,668,475 A | 9/1997 | Orban et al. |
| 5,781,436 A | 7/1998 | Forgang et al. |
| 5,808,963 A | 9/1998 | Esmersoy |
| 5,993,515 A | 11/1999 | Sirkar |
| 6,216,089 B1 | 4/2001 | Minerbo |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,380,744 B1 | 4/2002 | Clark et al. |
| 6,541,979 B2 | 4/2003 | Omeragic |
| 6,553,314 B2 | 4/2003 | Kriegshauser et al. |
| 6,556,015 B1 | 4/2003 | Omeragic et al. |
| 6,557,794 B2 | 5/2003 | Rosthal et al. |
| 6,566,881 B2 | 5/2003 | Omeragic et al. |
| 6,573,222 B1 | 6/2003 | Nair et al. |
| 6,584,408 B2 | 6/2003 | Omeragic |
| 6,586,939 B1 | 7/2003 | Fanini et al. |
| 6,594,584 B1 | 7/2003 | Omeragic et al. |
| 6,614,716 B2 | 9/2003 | Plona et al. |
| 6,624,634 B2 | 9/2003 | Rosthal et al. |
| 6,630,830 B2 | 10/2003 | Omeragic et al. |
| 6,667,620 B2 | 12/2003 | Homan et al. |
| 6,690,170 B2 | 2/2004 | Homan et al. |
| 6,718,266 B1 | 4/2004 | Sinha et al. |
| 6,727,705 B2 | 4/2004 | Frey et al. |
| 6,743,675 B2 | 6/2004 | Ding |
| 6,794,875 B2 | 9/2004 | Strickland |
| 6,819,112 B2 | 11/2004 | Gianzero et al. |
| 6,836,218 B2 | 12/2004 | Frey et al. |
| 6,911,824 B2 | 6/2005 | Bittar |
| 6,930,652 B2 | 8/2005 | Smith et al. |
| 6,969,994 B2 | 11/2005 | Minerbo et al. |
| 6,998,844 B2 | 2/2006 | Omeragic et al. |
| 2005/0083161 A1 | 4/2005 | Minerbo et al. |
| 2005/0256642 A1 | 11/2005 | Barber et al. |

FOREIGN PATENT DOCUMENTS

| | | |
|---|---|---|
| RU | 2107313 | 3/1998 |
| SU | 960701 | 4/1981 |
| SU | 998995 | 2/1983 |

OTHER PUBLICATIONS

VA Korolev et al., "Electromagnetic Logging by a Lateral Magnetic Dipole. Perspectives of Electromagnetic Well Scanning," Geofizika Scientific-Production Company, Russia (1995).

"Double Electromagnetic and Lateral Logging," Methodical Handbook, Moscow, Nedra, Russian (1991).

Hunka et al., "A New Resistivity Measurement System for Deep Formation Imaging and High-Resolution Formation Evaluation," SPE 20559, 65th Annual Technical Conference and Exhibition, New Orleans, LA, Sep. 23-26, 1990, (pp. 295-307).

Moran et al., "The Effects of Formation Anisotropy on Resistivity-Logging Measurements," Geophysics, vol. 44, No. 7 (Jul. 1979) pp. 1266-1286.

Anderson et al., "The Response of Induction Tools to Dipping, Anisotropic Formations," SPWLA 36th Annual Logging Symposium, Jun. 26-29, 1995, Paper D.

Anderson et al., "The Effect of Crossbedding Anisotropy on Induction Tool Response," SPWLA 39th Annual Logging Symposium, May 26-29, 1998, Keystone, CO, Paper B.

Davydycheva et al., "An Efficient Finite-Difference Scheme for Electromagnetic Logging in 3D Anisotropic Inhomogenous Media," Geophysics Vo. 68, No. 5 (Sep.-Oct. 2003) pp. 1525-1536.

APPARATUS AND METHODS FOR DETERMINING ISOTROPIC AND ANISOTROPIC FORMATION RESISTIVITY IN THE PRESENCE OF INVASION

CROSS-REFERENCE TO RELATED APPLICATIONS

This is a division of application Ser. No. 10/707,813 filed Jan. 14, 2004 now U.S. Pat. No. 7,091,877.

This claims priority to U.S. Provisional Patent Application Ser. No. 60/514,720, filed on Oct. 27, 2003. This Provisional Application is incorporated by reference in its entirety.

BACKGROUND OF INVENTION

1. Field of the Invention

The invention relates generally to the field of well logging. More particularly, the invention relates to tools and methods for measuring electrical properties of a formation with anisotropy and/or invasion.

2. Background Art

Induction tools have been used for many years to measure the resistivity of earth formations surrounding a borehole in the presence of borehole fluids that may have invaded the formations. Induction logging tools measure the resistivity (or its inverse, conductivity) of the formation by inducing eddy currents in the formations in response to an AC transmitter signal. The eddy currents induce secondary magnetic fields that in turn induce voltages in receiver antennas. Because the magnitudes of the eddy currents depend on formation conductivities, the magnitudes of the received signals thus reflect the formation conductivities.

A typical induction tool includes at least two induction arrays having different spacings between the transmitters and the receivers for different depths of investigation (DOI). An example of such tools is disclosed in U.S. Pat. No. 3,067,383 issued to Tanguy. A minimal configuration of such tools includes two coil arrays for measuring at two different DOI: a deep array (ILD) and a medium array (ILM). The deep array is designed to "see" beyond the mud invaded zone in order to provide true formation resistivity ($R_t$). However, in order to determine the minimum parameters (the invaded zone resistivity, $R_{xo}$, the resistivity of the uninvaded zone, $R_t$, and the radius of invasion, $r_i$) of a formation invaded by drilling fluids, at least three measurements at different depths of investigation are required. Historically, the third measurement (a shallow measurement) is provided by a focused electrode array. One such tool is disclosed in U.S. Pat. No. 3,329,889 issued to Tanguy. The shallow electrode measurement together with the medium (ILM) and deep (ILD) measurements provided by the induction arrays provide sufficient data to solve formation resistivities in a formation with a simple invasion profile. Such tools may not provide sufficient data for the determination of formation properties when the invasion profiles is complicated, e.g., more than one zone surrounding the borehole with different resistivities.

Therefore, multi-array tools have been introduced for the determination of formation resistivity in formations with more complex invasion profiles. Examples of multi-array tools include those disclosed in Hunka et al., "A New Resistivity Measurement System for Deep Formation Imaging and High-resolution Formation Evaluation," Paper SPE 20559, presented at the 65th SPE Annual Technical Conference and Exhibition, New Orleans, La., Sep. 23-26, 1990, and U.S. Pat. No. 5,157,605 issued to Chandler et al. The multiple arrays, having different spacings between the transmitter and the receiver, can provide measurements at different depths of investigation (DOI). Therefore, when mud invasion occurs to different extents (radii) in different layers, sufficient data may still be provided by such tools for solving formation electrical properties.

In addition to mud invasion, formation anisotropy can also complicate resistivity logging and interpretation. Formation anisotropy results from the manner in which formation beds were deposited by nature. Formations containing hydrocarbons often exhibit anisotropy in formation resistivity. In such formations, the horizontal conductivity, $\sigma_h$, (or resistivity, $R_h$) in a direction parallel to the bedding plane differs from the vertical conductivity, $\sigma_v$, (or resistivity, $R_v$) in a direction perpendicular to the bedding plane. In crossbedded reservoirs, the anisotropic resistivities may be better defined in two directions other than those that are parallel and perpendicular to the formation layers. For clarity of illustration, this description uses "horizontal" and "vertical" in a broad sense to describe the two orthogonal directions of the anisotropic resistivities, regardless of whether these directions are actually parallel or perpendicular to the bedding planes. The actual directions can be resolved by the inversion methods used in log analysis, for example the method to be described in FIG. 9.

Conventional induction logging tools, such as those described above, have their transmitters and receivers arranged in a manner such that their magnetic dipoles are aligned with the longitudinal axis of the tools. These longitudinal induction array tools induce eddy currents in loops that are perpendicular to the longitudinal axes of the tools. Therefore, these tools are sensitive only to the horizontal conductivity of the formations; they cannot provide a measure of vertical conductivity (or resistivity) or anisotropy.

To measure the vertical conductivity or anisotropy, new EM induction or propagation instruments typically include transmitter and/or receiver antennas that have their magnetic dipoles substantially perpendicular to the axis of the instrument. These tools with transverse induction arrays have good sensitivity to formation resistivity anisotropy. See e.g., Moran and Gianzero, "Effects of Formation Anisotropy on Resistivity Logging Measurements," Geophysics, 44, 1266-1286 (1979). Transverse induction arrays tools include triaxial array tools, which include three orthogonal transmitter coils and three receivers coils in the same orthogonal orientations. In operation, the tri-axial transmitter is energized in three orthogonal directions. Individual receiver coils aligned in the same three orthogonal directions then measure the voltages induced by eddy currents flowing in the surrounding formations. Examples of tri-axial tools, for example, may be found in U.S. Pat. No. 3,510,757 issued to Huston, U.S. Pat. No. 5,781,436 issued to Forgang et al., U.S. Pat. No. 3,609,521, issued to Desbrandes, U.S. Pat. No. 4,360,777, issued to Segesman, and U.S. Pat. No. 6,553,314 issued to Kriegshäuser, et al. These triaxial array induction tools can determine the formation anisotropic resistivity as long as the formation is uninvaded or the invasion depth is shallow.

Although certain prior art tools are capable of measuring resistivities of formations with complex invasion profiles and others are good for formations with anisotropy, prior knowledge of the formation type is needed in order to choose a proper tool. It is desirable that EM induction or propagation logging tools are available to provide reliable measurements of formation resistivities without prior knowledge of formation anisotropy and/or invasion.

SUMMARY OF INVENTION

In one aspect, embodiments of the invention relate to logging tools. A logging tool in accordance with one embodiment of the invention includes a tool body; a simple transmitter comprising a single antenna disposed on the tool body; four simple receivers, each comprising a single antenna, disposed on the tool body and spaced apart from the simple transmitter to form four arrays; and an electronic module for controlling operation of the four arrays, wherein the simple transmitter is configured to generate a magnetic field having a transverse component, wherein each of the four simple receivers is sensitive to the magnetic field generated by the simple transmitter, and at least one of the four simple receivers is sensitive to the transverse component of the magnetic field generated by the simple transmitter, and wherein the four arrays are configured to provide measurements at at least three depths of investigation.

A logging tool in accordance with another embodiment of the invention includes a tool body; a transmitter comprising two antennas disposed on the tool body, wherein the two antennas are arranged in different orientations; two simple receivers, each comprising a single antenna, disposed on the tool body and spaced apart from the transmitter; a third receiver, comprising two antennas, disposed on the tool body and spaced apart from the transmitter and the two simple receivers; and an electronic module for controlling operation of four arrays formed by the transmitter and the two simple receivers and the third receiver, wherein at least one of the two antennas in the transmitter is configured to generate a magnetic field having a transverse component, wherein at least one of the two antennas in the third receiver is responsive to the transverse component of the magnetic field generated by the transmitter, and wherein the four arrays are configured to provide measurements at at least three depths of investigation.

A logging tool in accordance with another embodiment of the invention includes a tool body; a transmitter comprising three antennas disposed on the tool body, wherein the three antennas are arranged in three different directions; two simple receivers, each comprising a single antenna, disposed on the tool body, wherein each of the two simple receivers is spaced apart from the transmitter; a third receiver disposed on the tool body and spaced apart from the transmitter and the two simple receivers, wherein the third receiver comprises three antennas arrange in three directions substantially identical to the three different directions of the three antennas of the transmitter; and an electronic module for controlling operation of the transmitter, the two simple receivers, and the third receiver, wherein arrays formed by the transmitter and the two simple receivers and the third receiver are configured to provide measurements at at least three depths of investigation.

A logging tool in accordance with another embodiment of the invention includes a tool body; a transmitter disposed on the tool body, wherein the transmitter is configured to generate a magnetic field having a transverse component; four receivers disposed on the tool body and spaced apart from the transmitter; and an electronic module for controlling operation of the transmitter and the four receivers, wherein each of the four receivers is responsive to the magnetic field generated by the transmitter, wherein at least one of the four receivers is responsive to the transverse component of the magnetic field generated by the transmitter, and wherein arrays formed by the transmitter and the four receivers provides at least three depths of investigation.

In another aspect, embodiments of the invention relate to a method for well logging. A method for well logging in accordance with one embodiment of the invention includes disposing a logging tool in a borehole penetrating a formation; obtaining a plurality of measurements of formation resistivity, wherein the plurality of measurements cover at least three different depths of investigation and at least one of the plurality of measurements is sensitive to formation anisotropy; and determining an electrical property of the formation based on the plurality of measurements.

Other aspects and advantages of the invention will be apparent from the following description and the appended claims.

DETAILED DESCRIPTION

Embodiments of the present invention relate to apparatus and methods for determining electrical properties of a formation having mud invasion and/or anisotropy. To solve the electrical properties ($R_{xo}$, $r_i$, and $R_t$) of a formation with invasion, three measurements at different DOIs are required. If the formation also has anisotropy, then one additional measurement that is sensitive to anisotropy is required (e.g., a transverse measurement). Therefore, a minimum of four measurements are required for solving a formation with invasion and anisotropy. These four measurements should be acquired at at least three different DOIs and at least one of the four measurements should be sensitive to formation anisotropy. The four measurements may be any of the following combinations: (1) three axial measurements and one transverse measurement; (2) two axial measurements and two transverse measurements; (3) one axial measurement and three transverse measurements; and (4) four transverse measurements.

Figure 13:
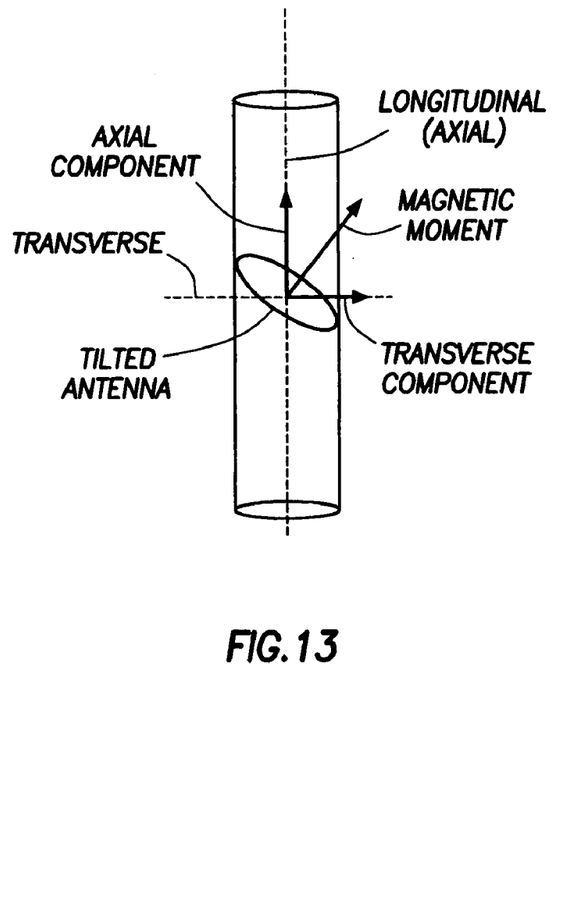
FIG. 13 shows a schematic illustrating an axial and a transverse component of a magnetic moment of a tilted antenna.

As used herein, "axial" means a direction parallel with the longitudinal axis of the tool, and "transverse" means a direction perpendicular to the longitudinal axis of the tool. Thus, an "axial" antenna (transmitter or receiver) refers to a coil having a magnetic moment parallel with the longitudinal axis of the tool, while a "transverse" antenna (transmitter or receiver) refers to a coil having a magnetic moment perpendicular to the longitudinal axis of the tool. A tilted antenna has a magnetic moment that is neither perpendicular nor parallel to the longitudinal axis of the tool. However, the magnetic moment of a tilted antenna can be decomposed into an axial component and a transverse component (see FIG. 13). In other words, the magnetic field generated by a tilted antenna includes a transverse component and an axial component. Embodiments of the invention may require the use of an axial receiver or a transverse receiver. In these cases, a tilted antenna may be used instead to provide the axial component or the transverse component. Therefore, a general term "axial-component" receiver is used in this description to refer to a receiver having a magnetic moment that includes a component in the axial direction, and "transverse-component" receiver is used to refer to a receiver having a magnetic moment that includes a component in the transverse direction. Thus, an "axial-component" receiver may include an axial antenna or a tilted antenna, and a "transverse-component" receiver may include a transverse antenna, a tilted antenna, or a triaxial antenna. A transmitter and a receiver form an array. In some embodiments, an array further includes a bucking receiver to reduce or remove the mutual couplings between the transmitter and the receiver. Thus, an "axial-component" array refers to an array that includes a transmitter and a receiver, each having a magnetic moment including a component in the axial direction, and a "transverse-component" array refers to an array that includes a transmitter and a receiver, each having a magnetic moment including a component in the transverse direction.

Accordingly, an axial measurement may be acquired with an axial array or an axial-component array, and a transverse measurement may be acquired with a transverse array or a transverse-component array. For example, a measurement acquired using a tilted array may be decomposed into an axial component measurement and a transverse component measurement.

As will be described later, any of the axial arrays (or axial-component arrays) in a tool of the invention may be replaced with an electrode device. Therefore, any or all of the axial measurements described above may be replaced with electrode (galvanic) measurements. Embodiments of the invention may use any electrodes device known in the art, including button electrodes, ring electrodes, and toroid electrodes. One of ordinary skill in the art would appreciate that an electrode device includes a current injector and a sensor for detecting currents that flow back to the tool. In this description, an "electrode" is used in a general sense to refer to an electrode device and is not limited to any particular type of electrode device. Note that four measurements represent a minimum requirement for solving electrical properties of a formation with a simple invasion profile (e.g., a single invaded zone with a constant resistivity) and a simple anisotropy (e.g., the direction of anisotropy is known). In a formation with more complicated invasion and/or anisotropy, more measurements will be required.

Thus, a resistivity logging tool in accordance with embodiments of the invention can provide at least four measurements, which include at least three measurements at different DOIs and at least one measurement that is sensitive to anisotropy. Several tool configurations are capable of providing these measurements. A simple tool configuration, for example, may comprise a common transmitter, three axial-component receivers, and a transverse-component receiver. Each receiver and the common transmitter from an array. Therefore, this simple tool configuration includes three axial-component arrays and one transverse-component array. Because the common transmitter needs to work in the axial-component arrays and the transverse-component array, it may include two coils—an axial coil (antenna) and a transverse coil. Alternatively, the transmitter may be a tilted antenna, which includes an axial component and a transverse component in the magnetic moment. Note that the common transmitter may also be a triaxial antenna. The magnetic moment of the transverse component in the transmitter preferably is preferably in the same direction as the magnetic moment of the transverse receiver; however, they may form an angle (other than 90°—i.e., not orthogonal) when projected onto a transverse plane. A transverse plane is a plane perpendicular to the longitudinal axis of the tool.

A "triaxial" antenna (transmitter or receiver) in this description is used in a broad sense to mean three antennas arranged in three non-coplanar directions, which may or may not be orthogonal to each other. If these antennas are not orthogonal to each other, their magnetic moments can be resolved into three orthogonal components. In preferred embodiments, the three antennas in a triaxial transmitter or receiver are arranged in orthogonal orientations. In more preferred embodiments, one of the three orthogonal antennas in the triaxial transmitter or receiver is in a direction substantially aligned with the longitudinal axis of the tool. In this case, the triaxial transmitter or receiver includes a longitudinal antenna and two transverse antennas.

While preferred embodiments of this invention involve the use of triaxial transmitters and receivers, in some cases, only transverse or tilted transmitters and receivers are necessary. For example, if the direction of anisotropy is unknown, then full triaxial measurements may be necessary. On the other hand, in a simple case where the direction of anisotropy is known, it is only necessary to have transverse measurements. In this description, "transmitter" and "receiver" are used to describe different functions of an antenna/coil, as if there were different types of coils. This is only for clarity of illustration. A transmitter coil and a receiver coil have the same physical characteristics, and one of ordinary skill in the art would appreciate that the principle of reciprocity applies and an antenna/coil may be used as a transmitter at one time and as a receiver at another. Thus, any specific description of transmitters and receivers in a tool should be construed to include the complementary configuration, in which the "transmitters" and the "receivers" are switched. Furthermore, in this description, a "transmitter" or a "receiver" is used in a general sense and may include a single coil, two coils, or three coils. If a single coil "transmitter" or "receiver" is desired, it will be referred to as a "simple transmitter" or a "simple receiver."

Figure 1:
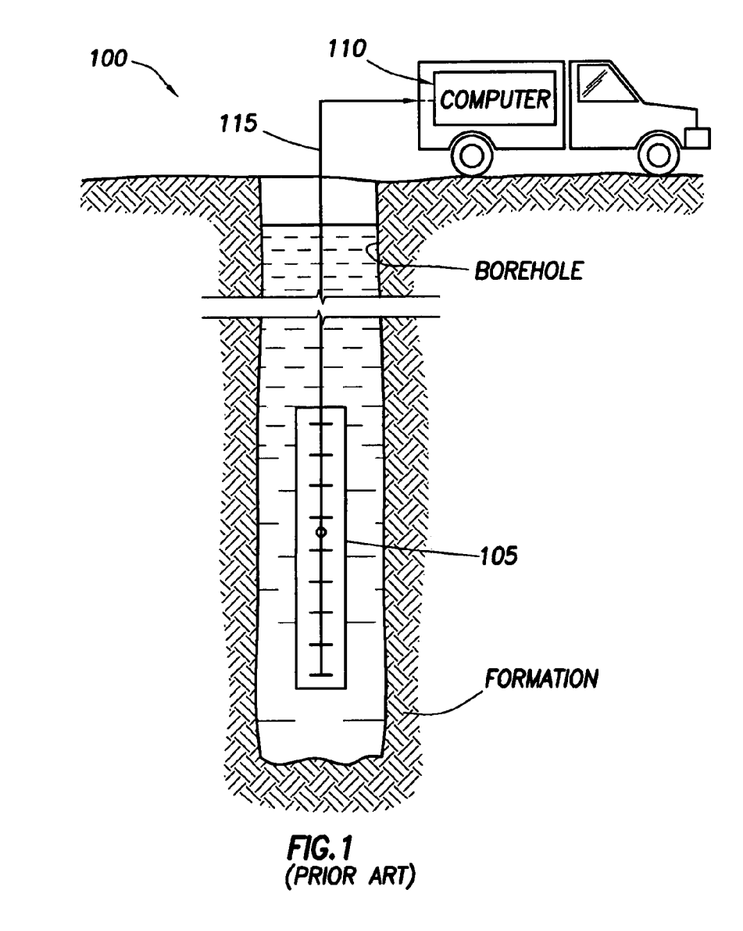
FIG. 1 shows a prior art logging system.

FIG. 1 shows a schematic of a typical logging system. Certain conventional details are omitted in FIG. 1 for clarity of illustration. The logging system 100 includes a logging tool 105 adapted to be moveable through a borehole. The logging tool 105 is connected to a surface equipment 110 via a wireline 115 (or drill string). Although a wireline tool is shown, those skilled in the art would appreciate that embodiments of the invention may be implemented in wireline or while-drilling (LWD or MWD) operations. The surface equipment 110 may include a computer. In accordance with embodiments of the invention, the logging tool 105 is equipped with at least three antenna arrays for determining a formation resistivity in the presence of invasion and/or anisotropy.

As noted above, to determine electrical properties of a formation that is radially inhomogeneous (e.g., invaded by drilling fluids or inherently inhomogeneous), measurements at multiple (e.g., three) depths of investigation (DOI) are required. A tool in accordance with embodiments of the invention may include a plurality of antenna arrays to provide at least three measurements at different DOIs and at least one measurement that is sensitive to anisotropy. Most of the plurality of antenna arrays may be axial arrays. However, at least one of them should be an array having a transverse component, i.e., a triaxial, tilted, or transverse array. For clarity, the following description may use triaxial arrays (transmitters or receivers) to illustrate embodiments of the invention. One of ordinary skill in the art would appreciate that other transmitters or receivers having transverse components (e.g., tilted or transverse transmitters or receivers) may be used in the place of the triaxial transmitter or receivers.

In accordance with one embodiment of the invention, a logging tool includes at least three antenna arrays and at least one of the at least three antenna arrays is responsive to the transverse component of the magnetic field generated by the transmitter (e.g., a triaxial, tilted, or transverse array). The at least one triaxial, tilted, or transverse array provides measurements that can be used to derive anisotropic properties of the formation, i.e., $R_h$, $R_v$, and anisotropy coefficient ($\lambda$). One example of such a tool is shown in FIG. 2.

Figure 2:
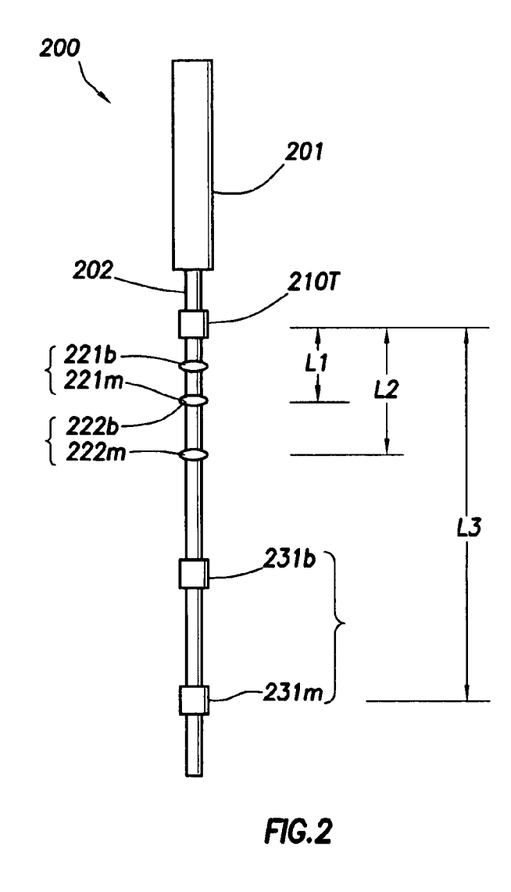
FIG. 2 shows a logging tool in accordance with one embodiment of the invention.

FIG. 2 shows an induction or propagation tool 200. Note that embodiments of the invention may be used as an induction tool or a propagation tool. Because the difference between these two types of tools is not germane to the present invention, the following description uses "induction" tools in a general sense to refer to both "induction" and "propagation" tools. As shown, the induction tool 200 includes an electronic module 201 and a mandrel 202, on which a series of antennas are disposed. The electronic module 201 includes components for controlling the signals to energize the transmitter and for controlling the acquisition of the signals (voltages) by the receivers. In addition, the electronic module may include a processor and/or a memory. The memory may store a program for performing the logging operation and data processing. The tool 200 also includes a protective housing (not shown) disposed over the various antennas. The induction tool 200 includes a triaxial transmitter 210T, two axial receivers, 221m and 222m, and one triaxial receiver, 231m. Each of the receivers is coupled with a corresponding bucking receiver, 221b, 222b, and 231b, respectively. In the notation, suffix "b" indicates that the antenna (coil) functions as a bucking receiver, and suffix "m" indicates that the antenna (coil) functions as a main receiver antenna. The function of a bucking receiver is to reduce or remove mutual couplings between the transmitter and the receiver.

The common triaxial transmitter 210T, the two axial receivers, 221m and 222m, and the two bucking receivers, 221b and 222b, together form two axial arrays, while the common triaxial transmitter 210T, the triaxial receiver 231m, and the triaxial bucking receiver 231b together form a triaxial array. As note above, a "triaxial" transmitter or receiver includes three coils having their magnetic moments oriented in non-coplanar directions, including orthogonal directions. Furthermore, the "triaxial" transmitter or receiver in this example may be replaced with a tilted transmitter or receiver. An array, whether axial or triaxial, includes a transmitter and a receiver. In preferred embodiments, an array further includes a bucking coil/receiver. In this description, "bucking receiver" is used to refer to bucking coils in general—e.g., a single-coil (axial) or three-coil (triaxial) bucking receiver. For an axial receiver, the bucking receiver comprises an axial coil wound in a direction opposite to the winding direction of the receiver coil. For a triaxial receiver, the bucking receiver (i.e., a triaxial bucking receiver) consists of three coils wound in the same orientations as those of the corresponding receiver coils, but in opposite directions.

Figure 3:
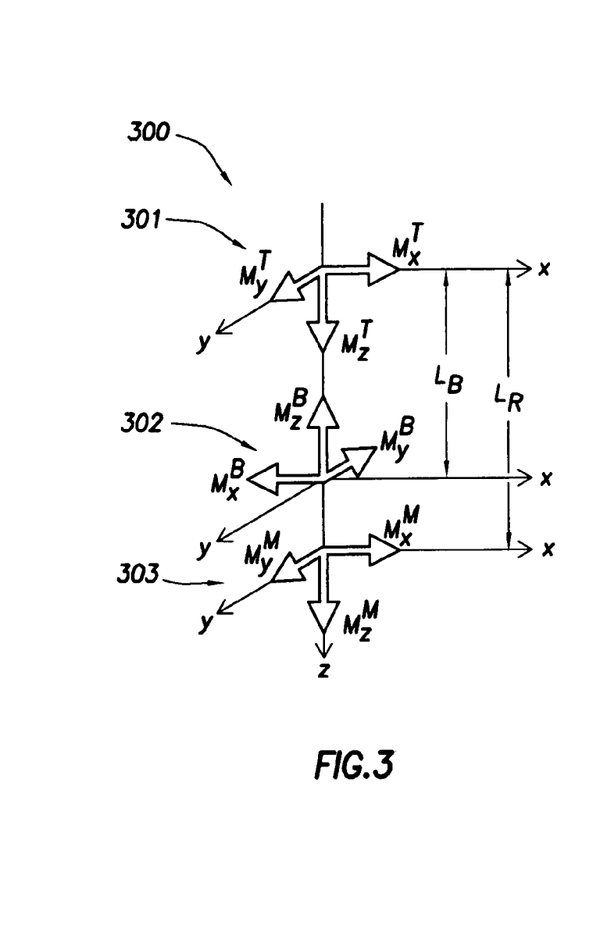
FIG. 3 illustrates a triaxial antenna array including a triaxial transmitter, a triaxial bucking receiver, and a triaxial receiver.

FIG. 3 shows a schematic of an exemplary triaxial array 300 that includes a triaxial transmitter 301, a triaxial bucking receiver 302, and a triaxial receiver 303. Although co-located coils are shown, one of ordinary skill in the art would appreciate that embodiments of the invention do not require the triaxial antennas to be co-located. Co-location means that the centers of the three coils are substantially at the same location. The triaxial transmitter 301 includes three coils having their magnetic dipoles ($M_x^T$, $M_y^T$ and $M_z^T$) oriented in orthogonal directions (x, y, z). The triaxial receiver 303 includes three coils having their magnetic dipoles ($M_x^R$, $M_y^R$ and $M_z^R$) oriented in the same orthogonal directions (x, y, z). The triaxial bucking receiver 302 includes three coils having their magnetic dipoles ($M_x^B$, $M_y^B$ and $M_z^B$) oriented in orthogonal directions that are in opposite directions (-x, -y, -z) to those of the transmitter 301 and the receiver 303. One of ordinary skill in the art would appreciate that the bucking receiver should be placed between the transmitter and the receiver. As shown, the bucking receiver 302 is disposed at a distance $L_B$ from the transmitter 301. The distance $L_B$ is shorter than the distance ($L_R$) between the transmitter 301 and the receiver 303. One skilled in the art will recognize that a triaxial array for embodiments of the invention need not be an "orthogonal" triaxial array. Furthermore, more complicated arrangements using multiple transmitter and or multiple receiver coils are also possible, both for axial and for triaxial induction arrays.

The precise location and the number of turns of the bucking coil should be selected to maximize the cancellation of the mutual couplings between the transmitter and the receiver. An example disclosed in U.S. Pat. No. 5,157,605 includes a bucking receiver disposed at the mid point between a transmitter and a receiver. In this configuration, the number of turns of the conductive wire in the bucking coil is ⅛ that of the receiver coil.

The induction tool 200 shown in FIG. 2 includes two axial arrays and one triaxial array. This represents an example of an induction tool that is capable of providing resistivity estimates for formations with invasion and anisotropy. In operation, the triaxial transmitter 210T is energized by passing an alternating current signal therethrough and the voltages received by the receiver in each array are recorded. The three antennas in the triaxial transmitter may be energized at different times (time multiplexing) or at different frequencies (frequency multiplexing) so that the responses recorded by the receivers may be differentiated.

In addition to time multiplexing or frequency multiplexing for signal identification, the triaxial transmitter 110T is preferably operated at more than one frequency to provide more than one set of measurements for data processing. The measurements from two or more frequencies, for example, may be used to reduce the skin effects and/or to focus the DOI as disclosed in U.S. Pat. No. 5,157,605 issued to Chandler et al. This patent is assigned to the assignee of the present invention and is incorporated by reference in its entirety. The operating frequency is preferably in the range of 5 to 200 KHz for induction tools. In some embodiments, an induction tool in accordance with the invention are operated at two frequencies, e.g., about 26 kHz and about 13 kHz. The lower frequency (relative to the conventional induction tools that may be operated at a frequency up to several hundred kHz) is desirable because of the greater skin effect on the transverse antennas or arrays. For propagation tools, the operating frequency is preferably in the range of 100 kHz to 2 MHz. In some preferred embodiments, the propagation tools are operated at two frequencies, e.g., about 400 kHz and about 2 MHz.

The receivers in these arrays are disposed at different distances from the common triaxial transmitter 110T. The different spacings (L1, L2, and L3) between the transmitter and the receivers provide different depths of investigation (DOI), i.e., different distances into the formation from the wellbore. Because skin effects are a function of transmitter frequencies in EM logging, it is possible to achieve different DOIs by varying the operating frequencies of the transmitters, instead of different transmitter-receiver spacings. In some embodiments of the invention, different DOIs are accomplished by operating the axial, transverse or triaxial arrays at multiple frequencies. The depth of investigation of an induction or propagation array is normally defined as the midpoint of the integrated radial response. One of ordinary skill in the art would appreciate that the radial response of an array depends on the spacing between the transmitter and the receiver, among other factors.

Figure 4:
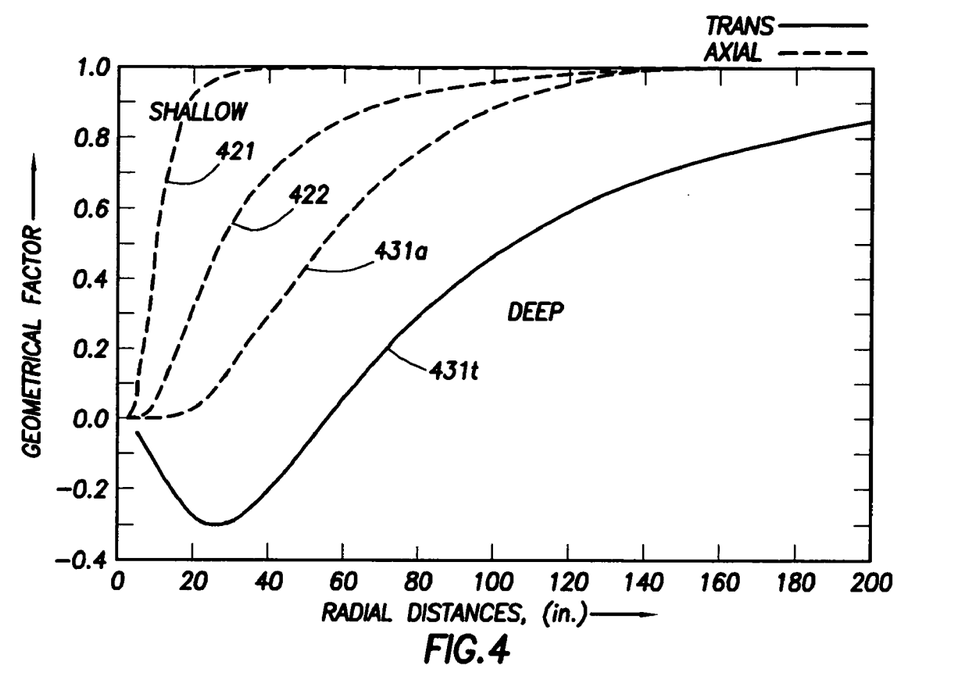
FIG. 4 shows a radial responses of the tool shown in FIG. 2 in accordance with one embodiment of the invention.

FIG. 4 shows the radial geometrical factors of the various arrays in the tool 200 of FIG. 2. Curves 421 and 422 represent the geometrical factors of the two axial receivers 221*m* and 222*m*, respectively, while curves 431*a* and 431*t* represent the axial component and the transverse component, respectively, of the triaxial receiver 231*m*. It is apparent that the short arrays (axial arrays) have larger responses in the near wellbore regions. The measurements from the short arrays can be used to correct for borehole effects and/or to derive the resistivity in the invaded zone. The long array (triaxial array) is more responsive to the formation regions farther away from the wellbore (see curves 431*a* and 431*t*). The axial component (curve 431*a*) can be combined with the two axial measurements to derive formation resistivity properties ($R_{xo}$, $r_t$, and $R_t$) in an isotropic formation. In an anisotropic formation, the transverse component (curve 431*t*) may be included to provide the horizontal resistivity ($R_h$), vertical resistivity ($R_v$), and anisotropy coefficient ($\lambda$). Thus, tool 200 is capable of providing reliable resistivity estimates of a formation regardless of mud invasion and/or anisotropy.

FIG. 2 shows an example of a tool configuration in accordance with embodiments of the invention. One of ordinary skill in the art would appreciate that other modifications are possible. For example, the tool may include a third axial array so that the three different DOI measurements required to solve the invasion profile do not rely on the axial component of the triaxial array. Another tool configuration may include a single transverse or triaxial array and a single axial array, such as the tool 200 of FIG. 2 without the bucking receiver 222*b* and the main receiver 222*m*. In this case, different operating frequencies may be used to obtain measurements at different DOIs. In FIG. 2, the first axial receiver 221*m* and the second bucking receiver 222*b* are shown to be co-wound at the same location on the mandrel 202. In some embodiments, these coils may not be co-wound and may be arranged at different axial locations along the mandrel 202. Furthermore, one of the axial arrays (e.g., the one including receiver 221*m*) may be replaced with an electrode device to provide the near wellbore resistivity measurements. It is known that in some situations (e.g., rugose boreholes or very high resistivity contrasts between conductive borehole fluids and resistive formations), electrode devices can provide more robust measurements than an induction array can.

Figure 5:
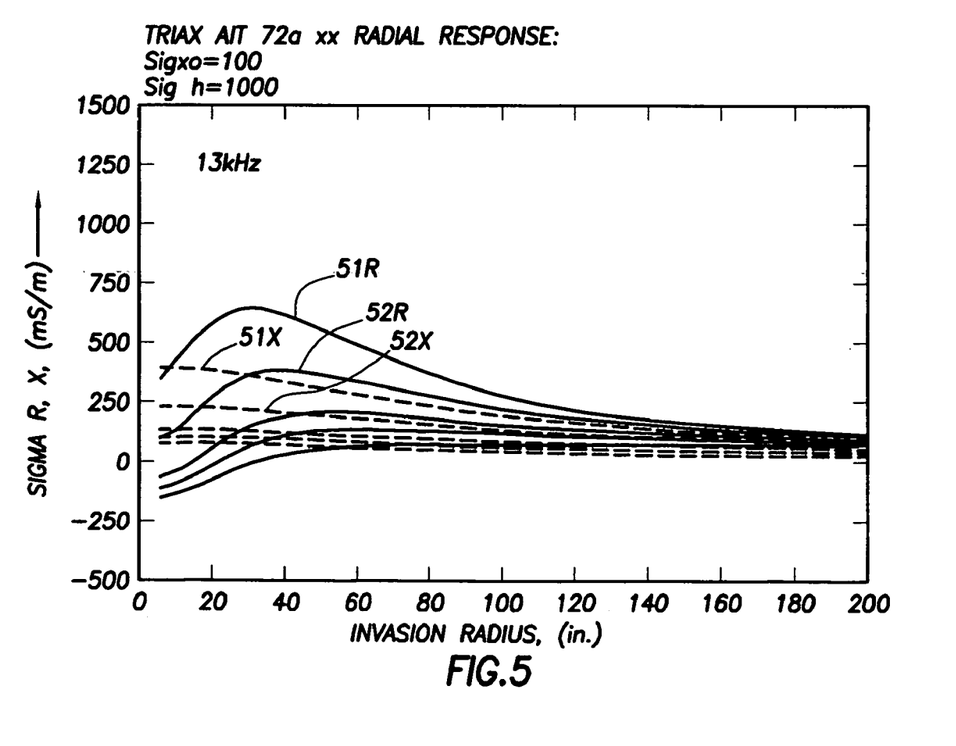
FIG. 5 shows a effects of mud invasion and anisotropy on the real (R) and quadrature (X) signals as acquired by a 72 inch triaxial array.

The tool shown in FIG. 2 can provide sufficient measurements to determine the electrical properties of a formation in which the invasion zone is isotropic. Mud filtrate invasion may render the invaded zone isotropic in an anisotropic formation. However, if invasion does not remove the anisotropy, then the horizontal ($R_{xo,h}$) and vertical ($R_{xo,v}$) resistivities in the invaded zone will be different. FIG. 5 shows that anisotropy remains detectable even when invasion zone advances 100 inches or more into the formation. The results shown in FIG. 5 are from a simulation of the xx transverse signals with the same spacings as the 72-inch array of an array induction tool sold under the trade name of AIT™ by Schlumberger Technology Corporation (Houston, Tex.). The formation has a horizontal conductivity ($\sigma_h$) of 1,000 mS/m and the invaded zone has a conductivity ($\sigma_{xo}$) of 100 mS/m. Five conditions with $R_v/R_h$=1, 2, 5, 10, and 50 are simulated, and both the in-phase signals ($\sigma$-R) and the quadrature signals ($\sigma$-X) are presented as a function of the invasion radius.

FIG. 5 clearly shows that the invasion does not completely remove the sensitivity to formation anisotropy even with the invasion reaching beyond 100 inches. For example, curves 51R and 51X, which represent the in-phase ($\sigma$-R) and the quadrature ($\sigma$-X) signals for $R_v/R_h$=1, are very different from curves 52R and 52X, which represent the in-phase ($\sigma$-R) and the quadrature ($\sigma$-X) signals for $R_v/R_h$=2. These results clearly show that anisotropy can remain in the invaded zone, and the common assumption that the invaded zone can be characterized with an isotropic resistivity ($R_{xo}$) may not be valid.

Figure 6:
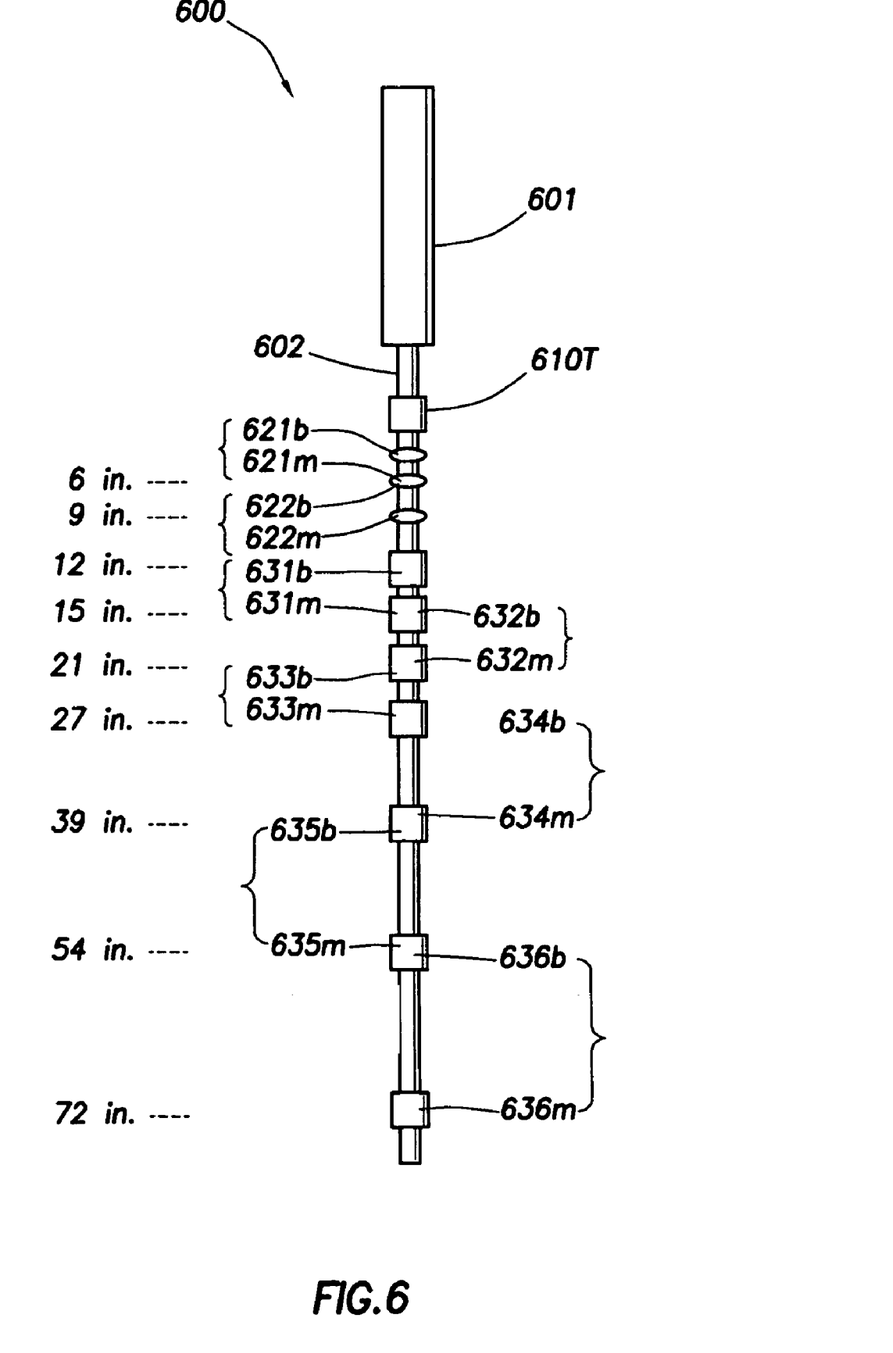
FIG. 6 shows a logging tool in accordance with one embodiment of the invention.

Thus, in order to fully characterize the formation properties, regardless of invasion or anisotropy, more than one transverse or triaxial array may be needed. FIG. 6 shows another induction or propagation tool according to embodiments of the invention. The induction tool 600 includes two axial arrays and six triaxial arrays, i.e., five more triaxial arrays than the induction tool 200 of FIG. 2. The induction or propagation tool 600 includes an electronic module 601 and a mandrel 602, on which a series of antennas are disposed. The induction or propagation tool 600 also includes a protective housing (not shown) disposed over the various antennas. The two axial arrays include the common triaxial transmitter 610T, three bucking receivers 621*b*, 622*b*, and three axial receivers 621*m*, 622*m*, while the six triaxial arrays include the common triaxial transmitter 610T, six bucking receivers 631*b*-636*b*, and six triaxial receivers 631*m*-636*m*. This embodiment includes two axial arrays. Thus, an axial component of one of the triaxial arrays is used to provide the third axial measurement, which together with the other two sets of axial measurements obtained by the two axial arrays provide measurements at three different DOIs for determining the invasion profile.

As shown in FIG. 6, the bucking receiver 622*b* is co-wound with the receiver 621*m*. Similarly, the six triaxial arrays comprise a series of co-wound bucking and receiver antennas. These co-wound antennas are for illustration only. Embodiments of the invention may use co-wound or non-co-wound antennas. If the bucking receiver of one array and the main receiver coil of a shorter array are co-wound, they may be co-wound on a bobbin that is made of ceramic or any suitable material. In the co-wound configuration, the arrays are arranged so that the main receiver coil of array n is at approximately the same axial location as the mutual-balancing (bucking) coil of array n+1. For example, the bucking receiver 623b for the main receiver 623m is co-wound with main receiver 622m on the same bobbin in FIG. 6. U.S. Pat. No. 5,668,475 issued to Orban et al. includes detailed description of co-wound bucking-main receiver coils. This patent is assigned to the assignee of the present invention and is incorporated by reference in its entirety.

One of ordinary skill in the art would appreciate that the spacings of various axial arrays and triaxial arrays may be selected to provide the desired depth of investigation (DOI). An example of the various spacings is shown in FIG. 6, in which the receivers in the two axial arrays are arranged at 6 and 9 inches from the common triaxial transmitter 310T, and the receivers in the six triaxial arrays are arranged at 15, 21, 27, 39, 54, and 72 inches from the common triaxial transmitter 310T. Note that this is only an example. One of ordinary skill in the art would appreciate that these spacings may be varied to obtained the desired DOIs. Furthermore, the relative positions of the transmitter and the traxial and axial receivers may be changed. That is, the transmitter need not be at the top of the tool section (tool body), and the triaxial receivers need not be at longer spacings from the transmitter than the axial receivers.

Figure 7:
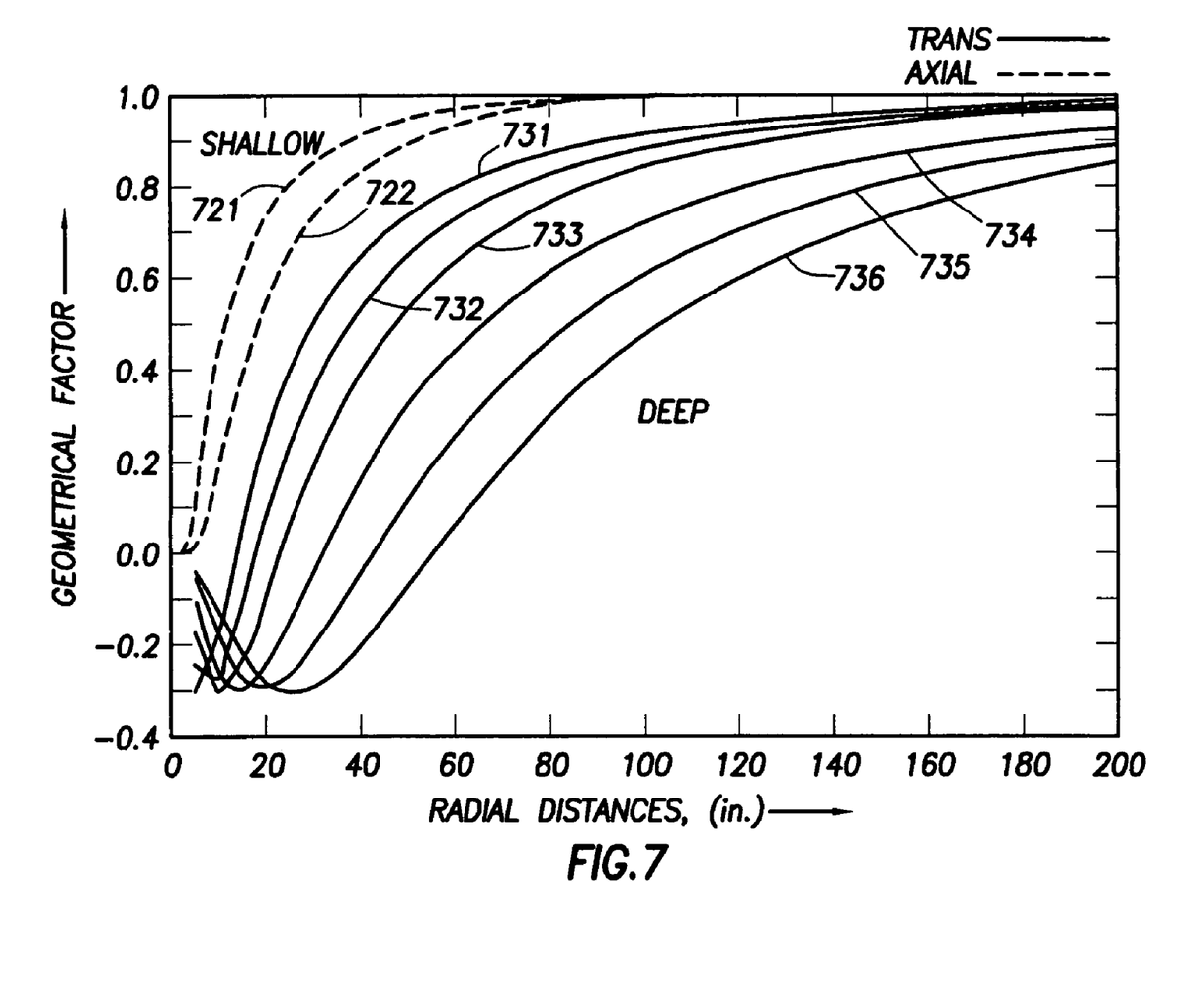
FIG. 7 shows a radial responses of the tool shown in FIG. 6 in accordance with one embodiment of the invention.

The shorter spacings (6 and 9 inches) of the axial arrays (short arrays) allow these short arrays to measure resistivity close to the borehole, as evidence by their radial geometrical factors (curves 721, 722) shown in FIG. 7. The near wellbore measurements may be used to correct borehole effects in measurements made by long arrays. In addition, the short array measurements may be used to derive the resistivity of the invaded zones, $R_{xo}$. Furthermore, the couplings between the transverse coils of the transmitter and the axial coils of the shorter array receivers can provide information concerning borehole size and the position of the tool in the borehole which is very useful in correcting for borehole effects.

The triaxial arrays, being at longer spacings, are designed to investigate at different distances into the formation, as evidenced by their radial geometrical factors (curves 731-736) shown in FIG. 7. Having triaxial measurements at a series of radial distances from the borehole makes it possible to derive the anisotropic resistivities in both the invaded and uninvaded zones. Thus, the induction or propagation tool 600 shown in FIG. 6 is capable of providing reliable formation resistivity measurements regardless of invasion and/or anisotropy.

As noted above, a tool configuration according to some embodiments of the invention includes three arrays, at least one of which is responsive to the transverse component of the magnetic field generated by the transmitter (e.g., a tilted or triaxial array). One example is shown in FIG. 2. FIG. 6 shows an induction or propagation tool 600 that includes additional triaxial arrays as compared with tool 200 in FIG. 2. In a similar manner, additional axial arrays may be added to the configuration of tool 200 in FIG. 2. One such example is shown in FIG. 8.

Figure 8:
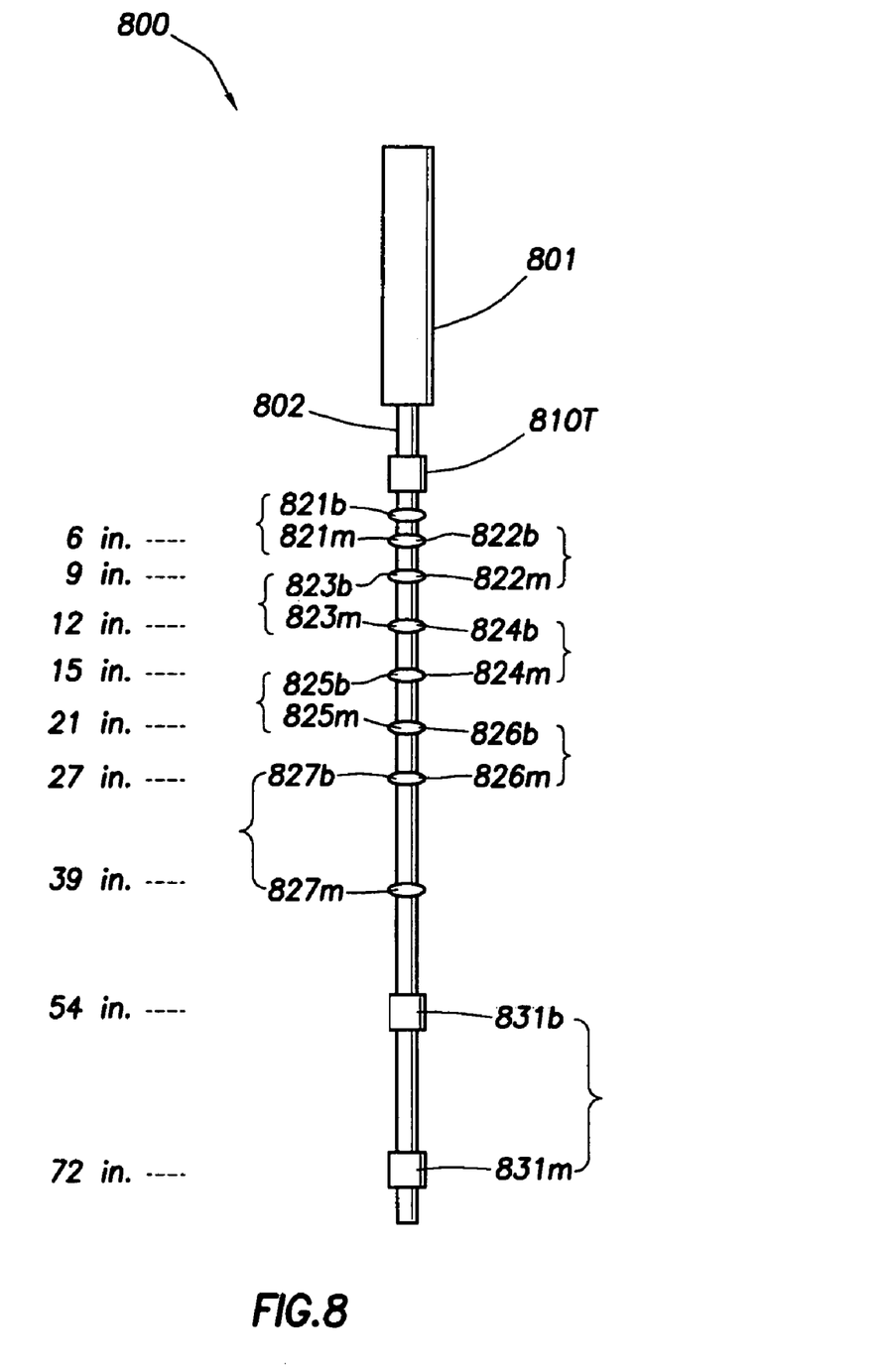
FIG. 8 shows a logging tool in accordance with one embodiment of the invention.

FIG. 8 shows an induction or propagation tool 800 that includes an electronic module 801 and a mandrel 802, on which antenna arrays are disposed. A protective housing (not shown) is also included for the protection of the antenna arrays. As shown, the induction or propagation tool 800 includes seven axial arrays and one triaxial arrays. That is, the induction or propagation tool 800 includes five additional axial arrays, as compared with the tool 200 shown in FIG. 2. The additional axial arrays can provide more robust measurements to define the invasions zones, even if the invasion radius is different in each layer. Thus, tool 800 can be used to measure electrical properties of formations with complex invasion profiles.

The EM induction or propagation tools shown in FIGS. 2, 6, and 8 are for illustrations only. One of ordinary skill in the art would appreciate that other modifications are possible without departing from the scope of the invention. In addition, one of ordinary skill in the art would appreciate that a tool of the invention may be used in wireline, logging-while-drilling (LWD), or measurement-while-drilling (MWD) operations. Furthermore, these tools may be used in boreholes drilled with water-based mud or oil-based mud.

In operation, each antenna in the transmitter is energized and the response in each receiver is recorded. The measurements from a triaxial array therefore consist of nine possible couplings between the transmitter antennas and the receiver antennas. The voltage measurements thus obtained may be represented as a 3×3 matrix shown in equation (1):

$$\begin{bmatrix} V_{xx} & V_{xy} & V_{xz} \\ V_{yx} & V_{yy} & V_{yz} \\ V_{zx} & V_{zy} & V_{zz} \end{bmatrix} \quad (1)$$

The raw voltage measurements in this matrix reflect the properties of the formation as seen by the tool in the borehole. In a deviated borehole (i.e., formation with relative dips), the raw measurements are influenced by the relative dips and/or strikes, which may complicate data processing. In this situation, it is desirable to rotate this matrix into a more convenient coordinate system before data analysis. For example, U.S. Pat. No. 6,584,408 issued to Omeragic discloses a method that converts a complete set of couplings between the transmitters and receivers of a triaxial system between a formation coordinate system and a tool coordinate system. The conversion simplifies the data processing and allows for a direct inversion of the measurements for horizontal and vertical conductivity and dip and strike (dip-azimuthal) angles.

The voltages received by an axial receiver from energizing the triaxial transmitter may be represented as a 3-element vector:

$$[V_{xz} V_{xy} V_{xz}] \quad (2)$$

The triaxial and axial measurements obtained with a tool of the invention may be analyzed (by inversion) using a proper formation model to derive the formation electrical parameters. The modeling may use any suitable programs known in the art. Examples of such programs include those disclosed in Anderson, et al., "*The Response of Induction Tools to Dipping Anisotropic Formations*," Transactions of the SPWLA 36th Annual Logging Symposium, Paris, France, Jun. 26-29, 1995, paper D, Anderson et al., "*The effect of crossbedding anisotropy on induction tool response*," presented at the SPWLA 39th Annual Logging Symposium, May 26-29, 1998, Keystone, Colo., Paper B, and Davydycheva, et al., "*An efficient finite-difference scheme for electromagnetic logging in 3D anisotropic inhomogeneous media*," Geophysics, Vol. 68, No. 5 (September-October 2003), p. 1525-1536.

Figure 9:
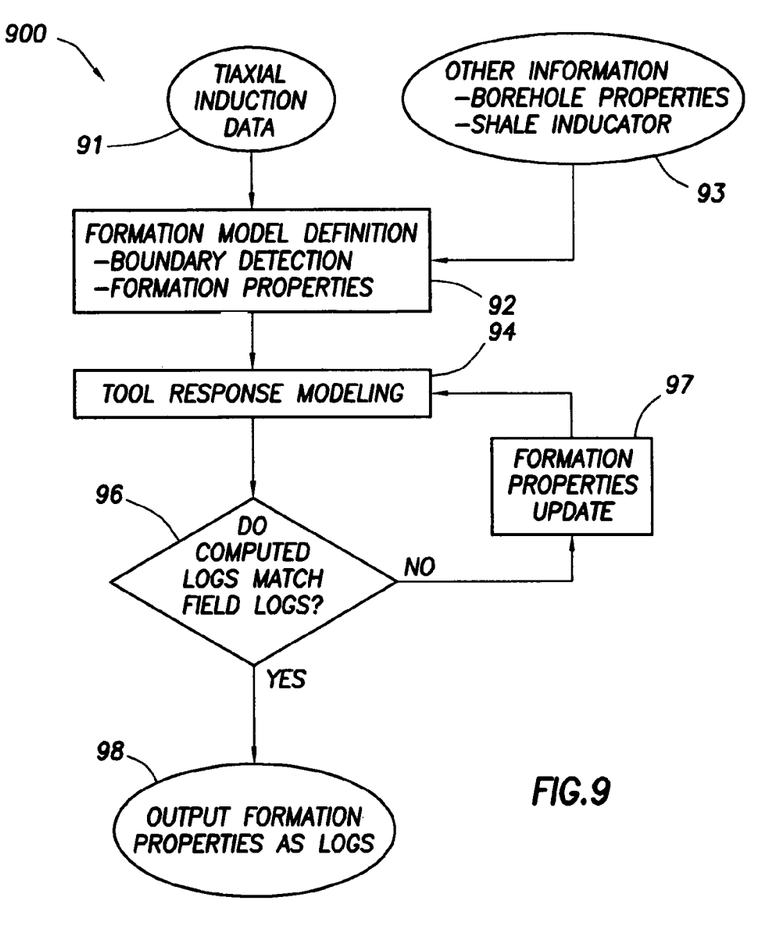
FIG. 9 shows a method for deriving formation resistivity from log data acquired using a tool in accordance with one embodiment of the invention.

FIG. 9 shows a flow chart depicting a method 900 for deriving formation resistivity properties from the axial and triaxial measurements. First a formation model is defined (shown as 92). This involves choosing a proper formation model, defining bed boundaries in the formation model, and determining some initial formation property estimates. This process may rely on data obtained from induction log, e.g., the triaxial induction data (shown as 91), and formation information available from other logs or other information about the formation such as, but not limited to, seismic data, mud logging or drilling data (shown as 93).

Figure 10:
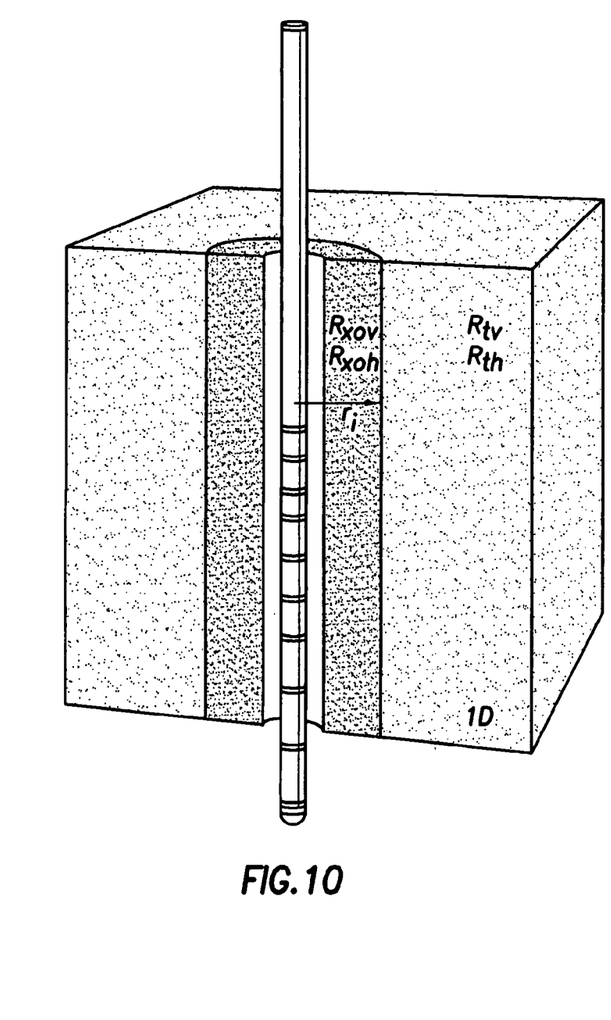
FIG. 10 shows a 1D formation model that may be used with a method in accordance with one embodiment of the invention.
Figure 11:
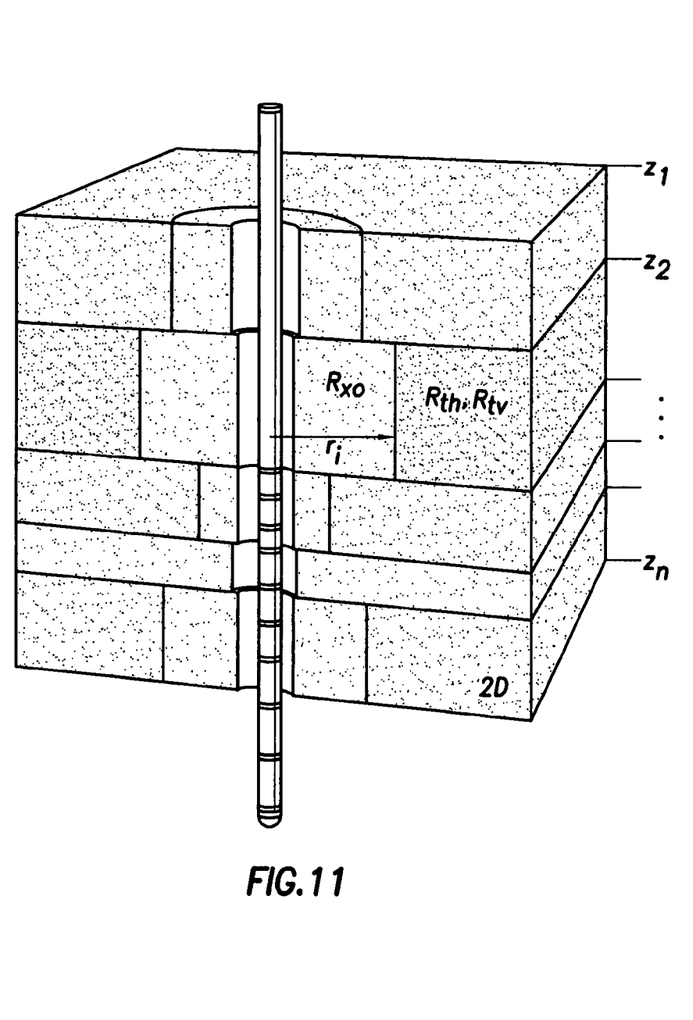
FIG. 11 shows a 2D formation model that may be used with a method in accordance with one embodiment of the invention.
Figure 12:
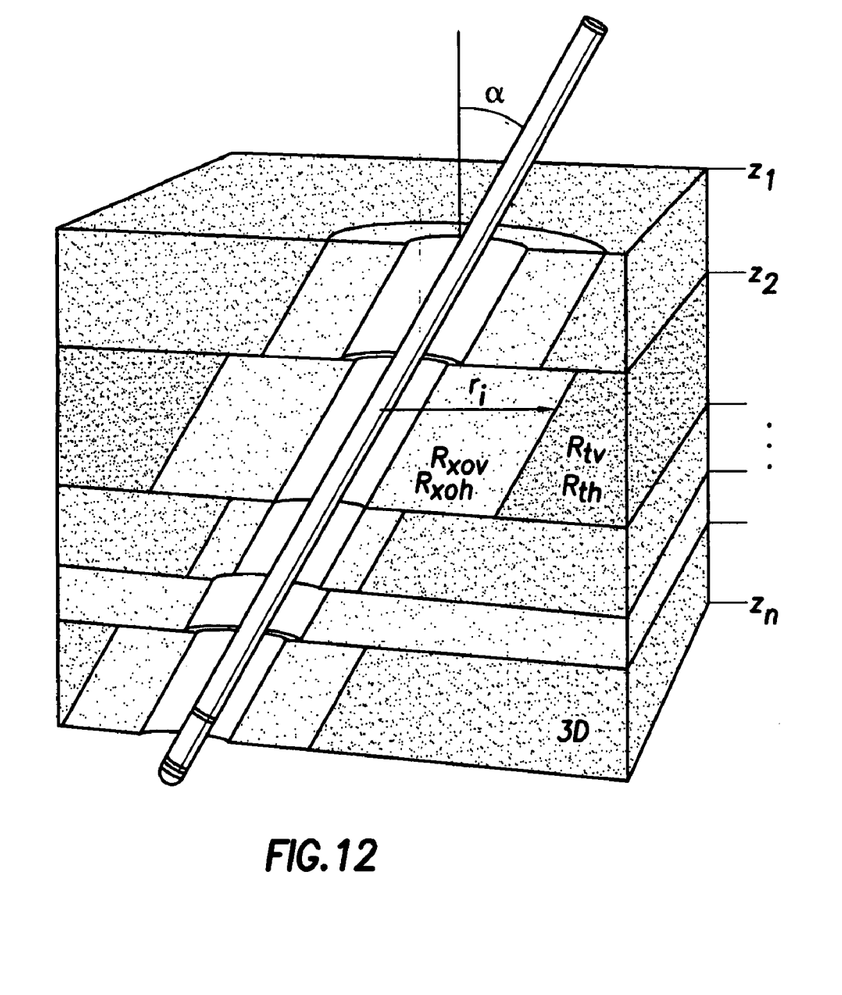
FIG. 12 shows a 3D formation model that may be used with a method in accordance with one embodiment of the invention.

Formation models that are commonly used to determine formation resistivity include 1D model, 1D+1D model, 2D model, and 3D model. FIG. 10 shows a 1D model, in which the resistivity varies with radial distance (r) from the wellbore. An alternative 1D model (not shown) involves resistivity variation as a function of the vertical distance (z). If the formation resistivity varies independently in both the radial (r) and vertical (z) directions, it may be modeled with a 1D+1D model (hot shown). If the radial variations (e.g., mud invasion fronts) are different in different sedimentation layers, then a 2D formation model shown in FIG. 11 may be used. If the well is deviated, then a 3D model may be necessary (FIG. 12).

Before modeling, the various couplings from each array may be corrected for borehole effects, shoulder effects, skin effects, and vertical resolution mismatches using any method known in the art. For example, the triaxial Grimaldi processing disclosed in U.S. Pat. No. 6,216,089 B1 issued to Minerbo and U.S. Pat. No. 6,304,086 B1 issued to Minerbo et al. may be used to correct for shoulder effects and vertical resolution mismatches in the log data. This processing yields a log of estimates of $R_v$ and $R_h$ with a depth of investigation defined by the Grimaldi spacing. Inverting this estimate using the radial responses in a 1D radial formation model (FIG. 10) or a 1D+1D model will produce estimates of the true formation anisotropic resistivity. For formations that the 1D+1D inversion is not sufficient, 2D or 3D inversions may be used.

Once a basic formation model is chosen, the formation parameters may be estimated by inverting the log data. A formation model is typically defined as a sequence of parallel layers. The first step of the inversion involves estimating bed boundary positions. Detection of the bed boundaries from the log data may be performed, for example, by a segmentation algorithm, which identifies and positions boundaries on a selected set of logs. A simple logic can be used to distinguish between invaded and uninvaded beds, based on a user-defined invasion flag, triggered from any log. The output of this task is a formation model described by a limited set of parameters: bed boundaries, horizontal and vertical resistivities for both the invaded and the virgin zone, and the invasion radius (see FIGS. 10-12).

The inversion process involves minimizing a cost function (or penalty function) C(p). An example of a cost (penalty) function may be defined as a weighted squared difference between the selected measurements and the corresponding modeled logs:

$$C(p) = \sum_i a_i \frac{\|M_i - f_i(p)\|^2}{\mu_i^2}, \quad (3)$$

where p is the unknown parameter vector (resistivities or geometrical parameters), $M_i$ is a measurement channel, $f_i$ is the corresponding theoretical tool response computed by a forward model, $\mu_i$ is the estimation of the confidence on measurement $M_i$, and $a_i$ a user-selected weight. The weight $a_i$, for example, can be used to decrease the influence of shallow array measurements in poor borehole conditions or unfavorable mud resistivity contrast for the tool. The summation in equation (3) may be performed on all tool measurements, i.e., measurements obtained by the axial arrays, triaxial arrays, and the electrode devices, if present. The inversion is an iterative process, which is terminated when the cost function is below a convergence criterion. In addition, various penalty functions can be added to the expression in equation 3 to stabilize the solution. These penalty functions can have a wide range of forms, but generally they serve to penalize formations with large variations in parameters or formations that vary greatly from geologically preferred models.

Referring to FIG. 9 again, once a formation model is defined, a forward model then computes the theoretical response of the tool to this formation model (step 94) and compares it with the actual measurements (step 96). If a significant mismatch occurs between the two (i.e., high cost function), the formation property values are refined (step 97) to reduce the difference. These processes are repeated until the match becomes acceptable with respect to specific convergence criteria. If the computed logs match the field data, then the modeling is terminated and the formation properties are output as formation logs (step 98). The output properties may include invasion profiles (e.g., radii of invasion), invasion zone resistivity (either isotropic resistivity, $R_{xo}$, or anisotropic resistivities, $R_{xo,v}$ and $R_{xo,h}$), and formation resistivity (either isotropic resistivity, $R_t$, or anisotropic resistivities, $R_v$ and $R_h$).

The above described modeling process may also provide an indicator of the quality of the parameter estimates. A quality control indicator is typically based on the values of the cost function or the individual log reconstruction errors. For example, a quality indicator may be defined as the difference between the measured values and the computed values as a percentage of the computed values:

$$\text{Rec}_i = 100 \times \frac{[M_i - f_i(p)]}{f_i(p)} \quad (4)$$

The above described inversion and modeling may be applied to any log data obtained using a tool in accordance with the invention. The method 900 shown in FIG. 9 is generally applicable regardless of formation dips, anisotropy, or invasion. Thus, the method in combination with a tool of the invention may be used to determine formation electrical properties regardless of mud invasion or formation anisotropy. The method can be implemented as a program stored on the electronic module (e.g., 201 in FIG. 2) of the induction tool or in a surface computer (e.g., 110 in FIG. 1).

The advantages afforded by embodiments of the present invention may include the following. Embodiments of the invention provide induction tools that can be used to provide sufficient measurements for deriving formation resistivities regardless of the extent of mud invasion and/or formation anisotropy. Because of this versatility, accurate determination of formation resistivities can be accomplished in any geographic region and in any borehole environment. Embodiments of the invention may be used in a wireline or an MWD/LWD tool. In addition, embodiments of the invention may be used in wells drilled with water-based mud or oil-based mud. A tool in accordance with the invention includes both axial and triaxial arrays, which have a common triaxial transmitter. This simplifies the tool configuration and improves manufacturing and operating efficiencies.

While the invention has been described with respect to a limited number of embodiments, those skilled in the art, having benefit of this disclosure, will appreciate that other embodiments can be devised which do not depart from the scope of the invention as disclosed herein. For example, an induction or propagation tool in accordance with embodiments of the invention may comprise various combinations of axial and triaxial arrays, not just the examples shown. In addition, a tool in accordance with embodiments of the inven-

What is claimed is:

1. A logging tool, comprising:
a tool body adapted for positioning in a borehole penetrating a formation; and
a plurality of antenna arrays disposed on or within the tool body, the antenna arrays comprising:
a simple transmitter comprising a single antenna, the simple antenna generating a magnetic field having a transverse component; and
four simple receivers, each comprising a single antenna, spaced apart from the simple transmitter, wherein each of the four simple receivers is response to the magnetic field generated by the simple transmitter and at least one of the four simple receivers is response to the transverse component of the magnetic field generated by the simple transmitter;
wherein the antenna arrays acquire at least four formation resistivity measurements to determine the invasion resistivity, the radius of invasion, the formation horizontal resistivity, the formation vertical resistivity, or any combination thereof, wherein the at least four formation resistivity measurements are acquired at least three different depths of investigation and at least one of the formation resistivity measurements is responsive to anisotropy.

2. The logging tool of claim 1, wherein the simple transmitter comprises a tilted or transverse antenna.

3. The logging tool of claim 2, wherein one of the four simple receivers comprises a tilted or transverse antenna oriented in a direction not orthogonal to a direction of the tilted or transverse antenna of the simple transmitter.

4. The logging tool of claim 1, wherein the antenna arrays comprise:
a transmitter comprising two antennas, wherein the two antennas are arranged in different orientations;
two simple receivers, each comprising a single antenna, spaced apart from the transmitter;
a third receiver, comprising two antennas, spaced apart from the transmitter and the two simple receivers; and
an electronic module for controlling operation of the antenna arrays,
wherein at least one of the two antennas in the transmitter is configured to generate a magnetic field having a transverse component, and
wherein at least one of the two antennas in the third receiver is responsive to the transverse component of the magnetic field generated by the transmitter.

5. The logging tool of claim 1, wherein the antenna arrays comprise:
a transmitter comprising three antennas, wherein the three antennas are arranged in three different directions;
two simple receivers, each comprising a single antenna, wherein each of the two simple receivers is spaced apart from the transmitter;
a third receiver spaced apart from the transmitter and the two simple receivers, wherein the third receiver comprises three antennas arranged in three directions substantially identical to the three different directions of the three antennas of the transmitter; and
an electronic module for controlling operation of the transmitter, the two simple receivers, and the third receiver.

6. The logging tool of claim 5, wherein the three different directions of the antennas of the transmitter are substantially orthogonal to each other.

7. The logging tool of claim 1, wherein the antenna arrays comprise:
a transmitter, wherein the transmitter is configured to generate a magnetic field having a transverse component;
four receivers spaced apart from the transmitter; and
an electronic module for controlling operation of the transmitter and the four receivers,
wherein each of the four receivers is responsive to the magnetic field generated by the transmitter, and
wherein at least one of the four receivers is responsive to the transverse component of the magnetic field generated by the transmitter.

8. The logging tool of claim 7, wherein the transmitter comprises two antennas arranged in two different directions, one of the four receivers comprises two antennas arranged in directions substantially identical to the two different directions of the two antennas in the transmitter.

9. The logging tool of claim 7, wherein the transmitter comprises a triaxial transmitter and one of the four receivers comprises a triaxial receiver.

10. The logging tool of claim 1, wherein the antenna arrays comprise:
a transmitter, wherein the transmitter is configured to generate a magnetic field having a transverse component;
an electrode spaced apart from the transmitter;
three receivers spaced apart from the transmitter and the electrode; and
an electronic module for controlling operation of the transmitter, the electrode, and the three receivers,
wherein the antenna arrays formed by the transmitter and the three receivers provide at least two depths of investigation, and
wherein at least one of the three receivers is responsive to the transverse component of the magnetic field generated by the transmitter.

11. The logging tool of claim 1, wherein the antenna arrays comprise:
a transmitter, wherein the transmitter is configured to generate a magnetic field having a transverse component;
two electrodes spaced apart from each other and from the transmitter;
two receivers spaced apart from the transmitter and the two electrodes; and
an electronic module for controlling operation of the transmitter, the two electrodes, and the two receivers,
wherein at least one of the two receivers is responsive to the transverse component of the magnetic field generated by the transmitter.

12. The logging tool of claim 1, wherein the antenna arrays comprise:
a transmitter, wherein the transmitter is configured to generate a magnetic field having a transverse component;
three electrodes spaced apart from each other and from the transmitter;
one receiver spaced apart from the transmitter and the three electrodes; and
an electronic module for controlling operation of the transmitter, the three electrodes, and the receiver,
wherein the receiver is responsive to the transverse component of the magnetic field generated by the transmitter.

13. The logging tool of claim 1, wherein one or more of the antenna arrays operates at different frequencies.

14. The logging tool of claim 1, wherein the different depths of investigation are obtained using different antenna array spacings and/or operating one or more of the antenna arrays at two or more frequencies.

15. The logging tool of claim 1, wherein the antenna arrays are configured to operate at frequencies ranging from about 5 KHz to about 200 KHz.

16. The logging tool of claim 1, wherein one or more of the antenna arrays is configured to operate at two frequencies.

17. The logging tool of claim 16, wherein the two frequencies are about 13 KHz and about 26 KHz.

18. The logging tool of claim 1, further comprising an electronic module disposed on or within the tool body.

19. The logging tool of claim 18, wherein the electronic module includes a program having instructions for determining at least one formation parameter.

20. The logging tool of claim 19, wherein the at least one formation parameter comprises at least one selected from an invasion radius, an invaded zone resistivity, and a formation resistivity.

21. The logging tool of claim 1, wherein the antenna arrays are induction and/or propagation arrays.

22. The logging tool of claim 1, wherein at least one of the antenna arrays is an induction array having a bucking coil.

23. The logging tool of claim 22, wherein the bucking coil is co-wound with at least one antenna in the antenna arrays.

24. A method comprising the steps of:
providing a plurality of antenna arrays disposed on or within a tool body; the antenna arrays comprising a simple transmitter comprising a single antenna and four simple receivers, each comprising a single antenna, spaced apart from the simple transmitter;
disposing the tool body in a borehole penetrating a formation;
generating a magnetic field having a transverse component from the simple transmitter;
obtaining a plurality of measurements of formation resistivity while the tool body is substantially at a particular location within the borehole, wherein the plurality of measurements cover at least three different depths of investigation and at least one of the plurality of measurements is sensitive to formation anisotropy; and
determining an electrical property of the formation based on the plurality of measurements.

25. The method of claim 24, wherein the step of determining an electrical property comprises determining an invaded zone resistivity, an un-invaded zone resistivity, formation anisotropy, or any combination thereof.

26. The method of claim 25, wherein the invaded zone resistivity comprises a horizontal resistivity and a vertical resistivity.

27. The method of claim 25, wherein the un-invaded zone resistivity comprises a horizontal resistivity and a vertical resistivity.

28. The method of claim 24, wherein the plurality of measurements comprise at least one galvanic measurement.

29. The method of claim 24, wherein the step of determining an electric property of the formation comprises using a formation model selected from a 1D model, a 1D+1D model, a 2D model, and a 3D model.

* * * * *